United States Patent Office 3,305,540
Patented Feb. 21, 1967

3,305,540
(CHLORO OR BROMO)-5-CYANOPYRIMIDINYL-
AMINO DYESTUFFS
Herbert Francis Andrew and Victor David Poole, Manchester, England, assignors to Imperial Chemical Industries Limited, London, England, a corporation of Great Britain
No Drawing. Filed Jan. 31, 1964, Ser. No. 341,735
Claims priority, application Great Britain, Sept. 12, 1960, 31,298/60
2 Claims. (Cl. 260—154)

This application is a continuation-in-part of our application Serial No. 132,557 which was filed in the United States Patent Office on August 21, 1961, and now abandoned.

This invention relates to new dyestuffs and more particularly it relates to new dyestuffs which are valuable for colouring textile materials in particular cellulose textile materials.

According to the invention there are provided the dyestuffs which are represented by the formula:

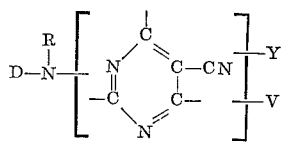

wherein D represents a dyestuff radical selected from the class consisting of dyestuff radicals of the azo, anthraquinone, nitro and phthalocyanine series;

R is selected from the class consisting of hydrogen and lower alkyl;

Y is a halogen atom selected from the class consisting of chlorine and bromine atoms;

And V is a radical selected from the class consisting of amino, lower alkylamino, hydroxy lower alkylamino, anilino, N-lower alkyl anilino, naphthylamino, and anilino, N-lower alkylanilino and naphthylamino radicals substituted by at least one group selected from the class consisting of carboxylic acid and sulphonic acid groups.

As examples of the lower alkyl radicals represented by R there may be mentioned methyl, ethyl, propyl and butyl radicals; it is however preferred that R represents a hydrogen atom.

Although the halogen atom represented by Y can be a chlorine or a bromine atom it is preferred that Y represents a chlorine atom.

As examples of the lower alkylamino radicals represented by V there may be mentioned N-(lower alkyl) amino and N:N-di(lower alkyl)amino radicals such as methylamino, ethylamino, propylamino, butylamino, dimethylamino, N-methyl-N-ethylamino, diethylamino and dipropylamino radicals. As examples of the hydroxy lower alkylamino radicals represented by V there may be mentioned N-(hydroxy lower alkyl)amino and N:N-di(hydroxy lower alkyl)amino radicals such as N-(β-hydroxyethyl)amino and N:N-di(β-hydroxyethyl)amino radicals. As examples of the N-lower alkylanilino radicals represented by V there may be mentioned N-methylanilino, N-ethylanilino and N-propylanilino radicals. As examples of the anilino, N-lower alkylanilino and naphthylamino radicals which are substituted by at least one carboxylic acid or sulphonic acid group there may be mentioned 2-, 3- or 4-sulphoanilino, 2-, 3- or 4-carboxyanilino, 4- or 5-sulpho-2-carboxyanilino, 2:4-, 2:5- or 3:5-disulphoanilino, 2-, 3- or 4-sulpho-N-methylanilino, 2:4- or 2:5-dicarboxyanilino, 5-, 6-, 7- or 8-sulphonaphth-2-ylamino, 6- or 7-sulphonaphth-1-ylamino and 5:7- or 6:8-disulphonaphth-2-ylamino radicals.

It is however preferred that V represents a monosulphoanilino or disulphoanilino radical.

The group of the formula:

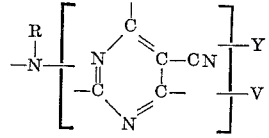

wherein R, V and Y have the meanings stated, present in the dyestuffs of the invention is attached directly to a carbon atom present in the dyestuff radical represented by D. The said carbon atom may form part of an aryl ring, which is preferably a benzene or a naphthalene ring, present in D or may form part of an alkyl chain which is directly attached to an aryl ring present in D or is attached through a bridging atom or group such as —O—, —S—, —CO—, —SO₂—, —NH—, —N-alkyl, —CONH—, —SO₂NH— and

—SO₂N-alkyl

It is preferred that the dyestuff radical represented by D contains at least one water-solubilising group which is preferably a carboxylic acid or, above all, a sulphonic acid group.

If desired the dyestuff radical D, particularly when D represents a dyestuff radical of the azo or phthalocyanine series, can contain a coordinately bound metal atom such as a coordinately bound copper, chromium or cobalt atom.

The dyestuff radicals of the azo series can be either monoazo or polyazo dyestuff radicals.

The dyestuffs of the invention can be obtained by reacting 2:4:6-trichloro-5-cyanopyrimidine or 2:4:6-tribromo-5-cyanopyrimidine with a dyestuff compound containing one or more —NHR groups and with ammonia or a primary or secondary amine of the formula V—H, wherein R and V have the meanings stated, one molecular proportion of one of the said pyrimidines and one molecular proportion of ammonia or the primary or secondary amine being used for each —NHR group present in the dyestuff compound.

The said pyrimidines can be reacted with the dyestuff compound and the resulting product comprising a di(chloro or bromo)-5-cyanopyrimidylamino derivative of the dyestuff compound subsequently reacted with ammonia or the primary or secondary amine; or alternatively the said pyrimidines can be reacted with ammonia or the primary or secondary amine and the resulting pyrimidine of the formula:

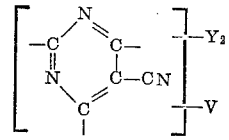

subsequently reacted with the dyestuff compound containing at least one —NHR group.

Thus the dyestuffs of the invention can be obtained by adding a solution of 2:4:6-tri(chloro- or bromo-)-5-cyanopyrimidine in a water-miscible organic liquid such as acetone or dioxan to a solution or suspension of the said dyestuff compound in water or in a mixture of water and a water-miscible organic liquid, stirring the mixture, preferably at a temperature between 10° and 50° C., whilst adding an acid-binding agent to maintain the pH of the mixture between 6 and 7, until condensation is complete, adding the ammonia or primary or secondary amine, stirring the mixture preferably at a temperature between 30° C. and 100° C. whilst again adding an acid-binding agent to maintain the pH of the mixture between 6 and 7. When the reaction is complete the dyestuff so obtained can be isolated by conventional methods, for example by the addition of sodium chloride to precipitate the dyestuff which is then filtered off.

Alternatively the dyestuffs of the invention can be obtained by stirring a mixture of the 2:4:6-tri(chloro- or bromo-)-5-cyanopyrimidine and the ammonia or primary or secondary amine in water, or in a mixture of water and a water-miscible organic liquid, preferably at a temperature between 20° and 100° C., whilst maintaining the pH of the mixture between 3 and 10 by the addition of an acid-binding agent, adding an aqueous solution of the dyestuff compound, stirring the resulting mixture, preferably at a temperature between 30° and 100° C., whilst maintaining the pH of the mixture between 6 and 7 by the addition of an acid-binding agent. At the completion of the reaction the dyestuff is then isolated by conventional methods.

As examples of the primary or secondary amines of the formula: V—H there may be mentioned methylamine, ethylamine, n-propylamine, n-butylamine, dimethylamine, diethylamine, di-n-propylamine, N-methyl-N-ethylamine, N-(β-hydroxyethyl)amine, N:N-di(β-hydroxypropyl)amine, aniline, N-methylaniline, N-ethylaniline, 1-naphthylamine, 2-naphthylamine, aniline-2-, 3- or 4-sulphonic acid, aniline-2-, 3- or 4-carboxylic acid, aniline-2:4-, 2:5- or 3:5-disulphonic acid, aniline-2:4-, or -2:5-dicarboxylic acid, N-methylaniline-2-, 3- or 4-sulphonic acid, 1-naphthylamine-4-, 5-, 6- or 7-sulphonic acid, 2-naphthylamine-5-, 6-, 7- or 8-sulphonic acid and 2-naphthylamine-5:7- or 6:8-disulphonic acid.

The dyestuff compounds containing at least one —NHR group which are used to obtain the dyestuffs of the invention may be any dyestuff compounds of the azo, anthraquinone, nitro or phthalocyanine series which contain at least one —NHR group. Such dyestuff compounds may be obtained by methods which are known for the production of dyestuff compounds of the said series containing at least one —NHR group.

As specific examples of such dyestuff compounds containing at least one —NHR group there may be mentioned the dyestuff compounds of the following classes without, however, limiting the classes to those specifically described.

(1) Monoazo compounds of the formula:

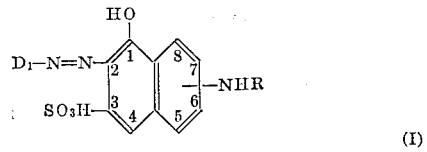

(I)

wherein $D_1$ represents a mono- or di-cyclic aryl radical which is free from azo groups and NHR groups, the —NHR group is preferably attached to the 6-, 7- or 8-position of the naphthalene nucleus, which may optionally contain a sulphonic acid group in the 5- or 6-position of the naphthalene nucleus.

$D_1$ may represent a radical of the naphthalene or benzene series which is free from azo substituents, for example a stilbene, diphenyl, benzthiazylolphenyl or diphenylamine radical. Also in this class are to be considered the related dyestuffs in which the NHR group, instead of being directly attached to the naphthalene nucleus is itself attached to a benzoylamino or anilino group which is itself attached to the 6-, 7- or 8-position of the naphthalene nucleus.

Particularly valuable dyestuffs are obtained from those compounds wherein $D_1$ represents a sulphonated phenyl or naphthyl radical, especially those which contain a —$SO_3H$ group in ortho position to the azo link; if desired the phenyl radical may be further substituted for example by halogen atoms such as chlorine, lower alkyl radicals such as methyl, acylamino groups such as acetylamino and lower alkoxy radicals such as methoxy.

(2) Disazo compounds of Formula I, wherein $D_1$ stands for a radical of the azobenzene, azonaphthalene or phenylazonaphthalene series and the naphthalene nucleus is substituted by the NHR group, and optionally by a second sulphonic acid group as in class 1.

(3) Monoazo compounds of the formula:

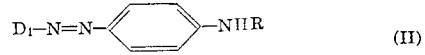

(II)

wherein $D_1$ stands for a mono- or di-cyclic aryl radical as described for class 1 and is preferably a disulphonaphthyl or a stilbene radical, and the benzene nucleus may contain further substituents such as halogen atoms, or lower alkyl, lower alkoxy, carboxylic acid and acylamino groups.

(4) Mono- or dis-azo compounds of the formula:

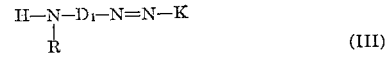

(III)

wherein $D_1$ represents an arylene radical such as a radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable keto-methylene compound (such as an acetoacetarylamide or a 5-pyrazolone) having the OH group in ortho or adjacent position to the azo group, $D_1$ preferably represents a radical of the benzene series containing a sulphonic acid group.

(5) Mono or dis-azo compounds of the formula:

$$D_1—N=N—K_2—NHR \qquad (IV)$$

wherein $D_1$ represents a radical of the types defined for $D_1$ in classes 1 and 2 above and $K_2$ represents the radical of an enolisable ketomethylene compound (such as an acetoacetarylamide or a 5-pyrazolone) having the —OH group in ortho or adjacent position to the azo group.

(6) The metal complex, e.g. the copper, chromium and cobalt complex, compounds of those dyes of Formulae I, III and IV (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

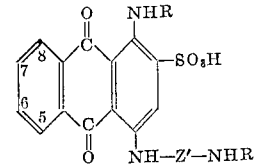

wherein the anthraquinone nucleus may contain an additional sulphonic acid group in the 5-, 6-, 7- or 8-position and Z' represents a bridging group which is preferably a divalent radical of the benzene series, for example phenylene, diphenylene, or 4:4'-divalent stilbene or azobenzene radicals. It is preferred that Z' should contain one sulphonic acid group for each benzene ring present.

(8) Phthalocyanine compounds of the formula:

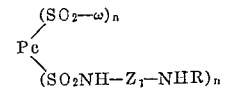

wherein Pc represents the phthalocyanine nucleus preferably of copper phthalocyanine, ω represents —OH and/or —$NH_2$, Z' represents a bridging group, preferably an aliphatic, cycloaliphatic or aromatic bridging group, $n$ and $m$ each represent a value of from 1 to 3 and may be the same or different provided that $n+m$ is not greater than 4.

(9) Nitro dyestuffs of the formula:

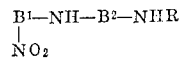

wherein B¹ and B² represent monocyclic aryl nuclei, the nitro group in B¹ being ortho to the —NH— group.

In class 1

6-amino-1-hydroxy-2-(2'-sulphophenylazo)naphthalene-3-sulphonic acid,
6-methylamino-1-hydroxy-2-(4'-acetylamino-2'-sulphophenylazo)naphthalene-3-sulphonic acid,
8-amino-1-hydroxy-2-(2'-sulphophenylazo)naphthalene-3:6-disulphonic acid,
8-amino-1-hydroxy-2-(4'-chloro-2'-sulphophenylazo)naphthalene-3:5-disulphonic acid,
7-amino-2-(2':5'-disulphophenylazo)-1-hydroxynaphthalene-3-sulphonic acid,
7-methylamino-2-(2'-sulphophenylazo)-1-hydroxynaphthalene-3-sulphonic acid,
7-methylamino-2-(4'-methoxy-2'-sulphophenylazo)-1-hydroxynaphthalene-3-sulphonic acid,
8-(3'-aminobenzoylamino)-1-hydroxy-2-(2'-sulphophenylazo)naphthalene-3:6-disulphonic acid,
8-amino-1-hydroxy-2:2'-azonaphthalene-1':3:5':6-tetrasulphonic acid,
8-amino-1-hydroxy-2:2'-azonaphthalene-1':3:5'-trisulphonic acid,
6-amino-1-hydroxy-2:2'-azonaphthalene-1':3:5'-trisulphonic acid,
6-methylamino-1-hydroxy-2:2'-azonaphthalene-1':3:5'-trisulphonic acid,
7-amino-1-hydroxy-2:2'-azonaphthalene-1':3-disulphonic acid,
8-amino-1-hydroxy-2-(4'-hydroxy-3'-carboxyphenylazo)naphthalene-3:6-disulphonic acid,
6-amino-1-hydroxy-2-(4'-hydroxy-3'-carboxyphenylazo)naphthalene-3:5-disulphonic acid.

In class 2

8-amino-1-hydroxy-2-[4'-(2''-sulphophenylazo)-2'-methoxy-5'-methoxyphenylazo]naphthalene-3:6-disulphonic acid,
8-amino-1-hydroxy-2-[4'-(4''-methoxyphenylazo)-2'-carboxyphenylazo]naphthalene-3:6-disulphonic acid,
8-amino-1-hydroxy-2-[4'-(2''-hydroxy-3'':6''-disulpho-1''-naphthylazo)-2'-carboxyphenylazo]naphthalene-3:6-disulphonic acid,
4:4'-bis(8''-amino-1''-hydroxy-3'':6''-disulpho-2''-naphthylazo)-3:3'-dimethoxydiphenyl,
6-amino-1-hydroxy-2-[4'-(2''-sulphophenylazo)-2'-methoxy-5'-methylphenylazo]naphthalene-3:5-disulphonic acid.

In class 3

2-(4'-amino-2'-methylphenylazo)naphthalene-4:8-disulphonic acid,
2-(4'-amino-2'-acetylaminophenylazo)naphthalene-5:7-disulphonic acid,
4-nitro-4'-(4''-methylaminophenylazo)stilbene-2:2'-disulphonic acid,
4-nitro-4'-(4''-amino-2''-methyl-5''-methoxyphenylazo)stilbene-2:2'-disulphonic acid,
4-amino-4'-(4''-methoxyphenylazo)stilbene-2:2'-disulphonic acid,
4-amino-2-methylazobenzene-2':5'-disulphonic acid.

In class 4

1-(2':5'-dichloro-4'-sulphophenyl)-3-methyl-4-(3''-amino-6''-sulphophenylazo)-5-pyrazolone,
1-(4'-sulphophenyl)-3-carboxy-4-(4''-amino-3''-sulphophenylazo)-5-pyrazolone,
1-(2'-methyl-5'-sulphophenyl)-3-methyl-4-(4''-amino-3''-sulphophenylazo)-5-pyrazolone,
1-(2'-sulphophenyl)-3-methyl-4-(3''-amino-4''-sulphophenylazo)-5-pyrazolone,
4-amino-4'-(3''-methyl-1'''-phenyl-4''-pyrazol-5''-onylazo)-stilbene-2:2'-disulphonic acid,
4-amino-4'-(2''-hydroxy-3'':6''-disulpho-1''-naphthylazo)-stilbene-2:2'-disulphonic acid,
8-acetylamino-1-hydroxy-2-(3'-amino-6'-sulphophenylazo)naphthalene-3:6-disulphonic acid,
7-(3'-sulphophenylamino)-1-hydroxy-2-(4'-amino-2'-carboxyphenylazo)naphthalene-3-sulphonic acid,
8-phenylamino-1-hydroxy-2-(4'-amino-2'-sulphophenylazo)naphthalene-3:6-disulphonic acid,
6-acetylamino-1-hydroxy-2-(5'-amino-2'-sulphophenylazo)naphthalene-3-sulphonic acid.

In class 5

1-(3'-aminophenyl)-3-methyl-4-(2':5'-disulphophenylazo)-5-pyrazolone,
1-(3'-aminophenyl)-3-carboxy-4-(2'-carboxy-4'-sulphophenylazo)-5-pyrazolone,
4-amino-4'-[3''-methyl-4''-(2''':5'''-disulphophenylazo)-1''-pyrazol-5''-onyl]stilbene-2:2'-disulphonic acid,
1-(3'-aminophenyl)-3-carboxy-4-[4''-(2''':5'''-disulphophenylazo)-2''-methoxy-5''-methylphenylazo]-5-pyrazolone.

In class 6

The copper complex of 8-amino-1-hydroxy-2-(2'-hydroxy-5''-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene-3:6-disulphonic acid,
The copper complex of 6-methylamino-1-hydroxy-2 (2'-carboxy-5'-sulphophenylazo)naphthalene-3-sulphonic acid,
The copper complex of 8-amino-1-hydroxy-2-[4'-2''-sulphophenylazo)-2'-methoxy-5'methylphenylazo]-naphthalene-3:6-disulphonic acid,
The copper complex of 6-amino-1-hydroxy-2-[4'-(2'':5''-disulphophenylazo)-2'-methoxy-5'-methylphenylazo]-naphthalene-3:5-disulphonic acid,
The copper complex of 1(3'-amino-4'-sulphophenyl)-3-methyl-4-[4''-(2''':5''''-disulphophenylazo)-2''-methoxy-5''-methylphenylazo]-5-pyrazolone,
The copper complex of 7-(4'-amino-3'-sulphoanilino)-1-hydroxy-2-[4''-(2''':5''''-disulphophenylazo)-2''-methoxy-5''-methylphenylazo]naphthalene-3-sulphonic acid,
The copper complex of 6-(4'-amino-3'-sulphoanilino)-1-hydroxy-2-(2''-carboxyphenylazo)naphthalene-3-sulphonic acid,
The 1:2-chromium complex of 7-amino-6'-nitro-1:2'-dihydroxy-2:1'-azonaphthalene-3:4'-disulphonic acid,
The 1:2-chromium complex of 6-amino-1-hydroxy-2(2'-carboxyphenylazo)naphthalene-3-sulphonic acid,
The 1:2-chromium complex of 8-amino-1-hydroxy-2-(4'-nitro-2'-hydroxyphenylazo)naphthalene-3:6-disulphonic acid,
The 1:2-cobalt complex of 6-(4'-amino-3'-sulphoanilino)-1-hydroxy-2(5''-chloro-2''-hydroxyphenylazo)-naphthalene-3-sulphonic acid,
The 1:2-chromium complex of 1-(3'-amino-4'-sulphophenyl)-3-methyl-4-(2''-hydroxy-4''-sulpho-1-naphthylazo)-5-pyrazolone,
The 1:2-chromium complex of 7-(4'-sulphoanilino)-1-hydroxy-2-(4''-amino-2''-carboxyphenylazo)naphthalene-3-sulphonic acid,
The 1:2-chromium complex of 1-(3'-aminophenyl)-3-methyl-4-(4''-nitro-2''-carboxyphenylazo)-5-pyrazolone.

In class 7

1-amino-4-(3'-amino-4'-sulphoanilino)anthraquinone-2-sulphonic acid, 1-amino-4-(4'-amino-3'-sulphoanilino)anthraquinone-2:5-disulphonic acid,
1-amino-4-[4'-(4''-amino-3''-sulphophenyl)anilino]anthraquinone-2:5-disulphonic acid,
1-amino-4-[4'-(4-amino-2''-sulphophenylazo)anilino]-anthraquinone-2:5-disulphonic acid,
1-amino-4-(4'-methylamino-3'-sulphoanilino)anthraquinone-2-sulphonic acid, In class 8

3-(3'-amino-4'-sulphophenyl)sulphamyl copper phthalocyanine-tri-3-sulphonic acid,
Di-4[(3'-amino-4'-sulphophenyl)sulphamyl]copper phthalocyanine-di-4-sulphonic acid,
3-(3'-aminophenylsulphamyl)-3-sulphamyl-copper phthalocyanine-di-3-sulphonic acid,
copper phthalocyanine-3-sulphonamide-3-[N-(3'-amino-4'-sulphophenyl)sulphonamide]-3-sulphonic acid,
copper phthalocyanine-3-sulphonamide-3-[N-(3'-methylaminophenyl)sulphonamide]-3-sulphonic acid, and
copper phthalocyanine-4-sulphonamide-4-[N-(4'-amino-3'-sulphophenyl)sulphonamide]-4-sulphonic acid.

In class 9

4-amino-2'-nitrodiphenylamino-3:4'-disulphonic acid,
4-amino-2':4'-dinitrodiphenylamine-3-sulphonic acid.

Alternatively the dyestuffs of the invention wherein D represents the radical of an azo dyestuff can be obtained by coupling a diazotised amine with a coupling component, wherein the amine or the coupling component or both contain a group of the formula:

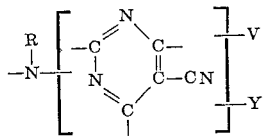

wherein R, V and Y have the meanings stated.

This reaction may be conveniently brought about by adding sodium nitrite to a solution or suspension of a diazotisable primary amine, which can be aminoazo compound, in a dilute aqueous solution of hydrochloric acid, adding the resulting aqueous solution or suspension of the diazo compound to an aqueous solution of the coupling component, if necessary adjusting the pH of the resulting mixture to effect coupling, and finally isolating the resulting azo dyestuff by conventional methods.

The diazotisable primary amines and coupling components which contain one of the said groups may themselves be obtained by reacting the corresponding primary amine or coupling component which contains a —NHR group with 2:4:6-tri(chloro- or bromo-)-5-cyanopyrimidine and subsequently reacting with ammonia or the appropriate amine of the formula: V—H.

The diazotisable primary amines are preferably diazotisable primary amines of the benzene or naphthalene series, while the coupling components are preferably coupling components of the phenol, naphthol, acetoacetarylamide or 5-pyrazolone series.

One preferred class of the dyestuffs of the invention are the dyestuffs which, in the form of the free acids, are represented by the formula:

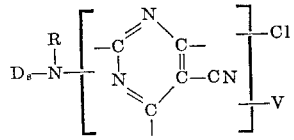

wherein R and V have the meanings stated, and $D_s$ represents a dyestuff radical of the azo, anthraquinone, nitro or phthalocyanine series which contains at least one sulphonic acid group.

The dyestuffs of the invention are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibers. For this purpose the dyestuffs can be applied to the textile materials by dyeing, padding or printing using in the latter case printing pastes containing the conventional thickening agents or oil-in-water emulsions or water-in-oil emulsions, whereby the textile materials are coloured in bright shades, which can be obtained in heavy depths of shade, possessing excellent fastness to wet treatments such as washing, to light and to storage in an acid atmosphere.

The dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent, can be used.

For example the cellulose textile material can be coloured by treating the cellulose textile material with an aqueous solution or suspension of the acid-binding agent and then immersing the so treated cellulose textile material in a dyebath comprising a solution of one or more of the said dyestuffs, as hereinbefore defined, at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-binding and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the dyestuffs, as hereinbefore defined, which solution also contains an acid-binding agent, passing the so treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of the one or more of the said dyestuffs which solution also contains an acid-binding agent, at a suitable temperature for example between 0° and 100° C., and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution or suspension of the acid-binding agent or in the aqueous solution of the dyestuffs is not critical but it is preferred to use between 0.1% and 10% of the acid-binding agent based on the total weight of the said aqueous solutions or suspension. If desired the aqueous solution or suspension of the acid binding agent may also contain further substances, for example electrolytes such as sodium sulphate.

The aqueous solution of the one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

Alternatively the cellulose textile materials can be printed with a printing paste containing one or more of the new dyestuffs of the invention.

This may be conveniently brought about by applying a printing paste containing one or more of the said dyestuffs to a cellulose textile material which has been impregnated with an acid-binding agent and thereafter subjecting the printed cellulose textile material to the action of heat or steam. Alternatively a printing past containing one or more of the said dyestuffs and containing an acid-binding agent can be applied to the cellulose textile material and the printed cellulose textile material subsequently subjected to the action of heat or steam. Alternatively a printing paste containing one or more of the said dyestuffs can be applied to the cellulose textile material which is subsequently immersed in a hot aqueous solution or suspension of the acid-binding agent or alternatively the printed textile material is impreganted with an aqueous solution or suspension of the acid-binding agent and subsequently subjected to the action of heat or steam.

After applying the printing paste to the cellulose textile material the printed textile material may, if desired, be dried, for example at a temperature between 20° and 100° C., before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium alginate, water-in-oil emulsions, oil-in-water emulsions, surface-active agents, sodium m-nitrobenzene sulphonate, and organic liquids, for example ethanol.

At the conclusion of the dyeing and/or printing processes it is preferred to subject the so coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

The invention is illustrated but not limited by the following examples in which the parts and percentages are by weight.

*Example 1*

A solution of 3.85 parts of metanilic acid in 52.2 parts of a 1.7% aqueous solution of sodium hydroxide is added during 10 minutes to a solution of 4.6 parts of 5-cyano-2:4:6-trichloropyrimidine in a mixture of 100 parts of dioxane and 50 parts of water, and the resulting mixture is stirred for 2 hours at a temperature between 20° and 25° C., the pH of the mixture being maintained between 5 and 6 by the addition of sodium carbonate. A solution of 12.6 parts of the trisodium salt of 1-amino-4-(4'-aminoanilino)anthraquinone-2:3':5-trisulphonic acid in 250 parts of water is then added and the mixture so obtained is stirred for 1½ hours at a temperature between 50° and 55° C., then for 1 hour at 65° to 70° C. and finally for 8 hours at 90° to 95° C., the pH of the mixture being maintained between 6 and 7 by the addition of sodium carbonate. The mixture is cooled to 20° C., 90 parts of sodium chloride are added and the precipitated dyestuff is filtered off, washed with a 25% aqueous solution of sodium chloride and finally dried.

When applied to cellulose textile materials in conjunction with a treatment with an acid-binding agent the dyestuff yields blue shades possessing excellent fastness to wet treatments.

*Example 2*

A solution of 3.3 parts of 5-cyano-2:4:6-trichloropyrimidine in 50 parts of dioxan is added to a solution of 3.5 parts of sodium metanilate in 50 parts of water and the resulting mixture is stirred for 2 hours at 5° C., the pH of the mixture being maintained at 6.5 by the addition of sodium carbonate. The resulting solution is added to a solution of 16 parts of the sodium salt of copper phthalocyanine-3-sulphon-N - (4'-aminophenyl)amide-3-sulphonamide-3-sulphonic acid in 400 parts of water and the resulting mixture is stirred for 5 hours at 50° C., the pH of the mixture being maintained at 6.5 by the addition of an aqueous solution of sodium hydroxide. The resulting solution is cooled to 20° C., 100 parts of sodium chloride are added and the precipitated dyestuff is filtered off and dried.

When applied to cellulose textile materials in conjunction with a treatment with an acid-binding agent the dyestuff yields greenish-blue shades possessing excellent fastness to wet treatments.

*Example 3*

In place of the 3.5 parts of sodium metanilate used in Example 2 there are used 4.6 parts of disodium aniline-2:5-disulphonate when a similar dyestuff is obtained.

*Example 4*

3.3 parts of 5-cyano-2:4:6-trichloropyrimidine are condensed with 3.5 parts of sodium metanilate by the method described in Example 2 and the resulting solution is added to a solution of 5.8 parts of the sodium salt of 4-ethoxy-3'-amino-2 - nitrodiphenylamine - 4'-sulphonic acid in 220 parts of water. The resulting mixture is then stirred at a temperature between 75° and 80° C. until no further additions of an aqueous solution of sodium hydroxide are required to maintain the pH of the mixture at 6.5. 85 parts of potassium acetate are then added and the precipitated dyestuff is filtered off and dried.

When applied to cellulose textile materials in conjunction with a treatment with an acid-binding agent the dyestuff yields yellow shades possessing excellent fastness to washing.

*Example 5*

A solution of 3.5 parts of sodium metanilate in 25 parts of water is added to a solution of 13.4 parts of the trisodium salt of 2-[N-(dichloro-5''-cyanopyrimidylamino)-N-methylamino]-5-hydroxy-6:2'-azonaphthalene - 7-1':5'-trisulphonic acid (which is the dyestuff of Example 34 of United States patent specification No. 3,120,507) in 180 parts of water and the resulting mixture is stirred for 3 hours at a temperature between 60° and 65° C., the pH of the mixture being maintained between 7.0 and 7.2 by the addition of sodium carbonate. 35 parts of sodium chloride are then added and the precipitated dyestuff is filtered off, washed with acetone and dried.

On analysis the dyestuff is found to contain 0.92 atom of organically bound chlorine per molecule of dyestuff. When applied to cellulose textile materials in conjunction with a treatment with an acid-binding agent the dyestuff yields orange shades possessing excellent fastness to wet treatments.

*Example 6*

A solution of 3.5 parts of 5-cyano-2:4:6-trichloropyrimidine in 25 parts of acetone is added with stirring to a solution of 10.5 parts of the trisodium salt of 6-N-methylamino-1-hydroxy-2:2' - azonaphthalene - 1':3:5'-trisulphonic acid in 150 parts of water and the mixture is then stirred for 1½ hours the pH of the mixture being maintained between 6.8 and 7 by the addition of a 10% aqueous solution of sodium carbonate. A solution of 3.5 parts of the sodium salt of 1-aminobenzene-4-sulphonic acid in 25 parts of water is then added and the mixture is heated at a temperature between 60.° C. and 65° C. for 3 hours the pH being maintained between 7 and 7.2 by the addition of a 10% aqueous solution of sodium carbonate. Sodium chloride is added and the dyestuff which is precipitated is filtered off, slurred with 50 parts of acetone, refiltered and dried.

On analysis, the dyestuff is found to contain 0.92 atom of organically bound chlorine for each molecule of dyestuff. When applied to cellulose textile materials in conjunction with a treatment with an acid-binding agent, the dyestuff yields reddish-orange shades possessing good fastness to washing and to light.

*Example 7*

In place of the 3.5 parts of 5-cyano-2:4:6-trichloropyrimidine used in Example 6 there are used 5.8 parts of 5-cyano-2:4:6-tribromopyrimidine whereby a dyestuff is obtained which contains 0.9 atom of organically bound bromine per molecule of dyestuff.

When applied to cellulose textile materials in conjunction with a treatment with an acid-binding agent the dyestuff yields reddish-orange shades possessing good fastness to washing and to light.

*Example 8*

In place of the 10.5 parts of the trisodium salt of the azo compound used in Example 6 there are used 12.9 parts of the tetrasodium salt of the copper complex of 2-amino-6-[2' - methoxy-5'-methyl-4'-(2":5" - disulphophenylazo)phenylazo] - 5-naphthol-1:7-disulphonic acid, and in place of the 3.5 parts of the sodium salt of 1-aminobenzene-4-sulphonic acid used in Example 6 there are used 4.7 parts of the disodium salt of 5-sulpho-2-aminobenzoic acid whereby there is obtained a dyestuff which contains 0.88 atom of organically bound chlorine per molecule of dyestuff.

When applied to cellulose textile materials in conjunction with a treatment with an acid-binding agent the dyestuff yields navy-blue shades possessing very good fastness to light and to washing.

The following table gives further examples of the dyestuffs of the invention which are obtained, by methods similar to those described in Examples 1 to 8, by condensing the pyrimidines listed in the third column of the table with the dyestuff compounds listed in the second column of the table and with the amines listed in the fourth column of the table. The fifth column of the table indicates the shades obtained when the dyestuffs are applied to cellulose textile materials.

| Example | Dyestuff Compound | Pyrimidine | Amine | Shade |
|---|---|---|---|---|
| 9 | 2-amino-6-(2'sulphophenylazo)-5-naphthol-7-sulphonic acid. | 2:4:6-trichloro-5-cyano pyrimidine. | Aniline-3-sulphonic acid | Orange. |
| 10 | ---do--- | ---do--- | 4-sulpho-2-aminobenzoic acid. | Do. |
| 11 | 2-(4'-amino-2'-methylphenylazo)naphthalene-4:8-disulphonic acid. | ---do--- | Aniline-3:5-disulphonic acid | Reddish-yellow. |
| 12 | 2-(4'-amino-2'-ureidophenylazo)naphthalene-3:6:8-trisulphonic acid. | ---do--- | Aniline | Do. |
| 13 | ---do--- | ---do--- | Aniline-3-sulphonic acid | Do. |
| 14 | 1-amino-7-(2'-sulphophenylazo)-8-naphthol-3:6-disulphonic acid. | ---do--- | ---do--- | Red. |
| 15 | ---do--- | ---do--- | 5-sulpho-2-aminobenzoic acid. | Do. |
| 16 | 1-(4'-sulphophenyl)-3-carboxy-4-(3"-amino-6"-sulphophenylazo)-5-pyrazolone. | 2:4:6-tribromo-5-cyanopyrimidine. | Ammonia | Greenish-yellow. |
| 17 | 1-(4':8'-disulphonaphth-2'-yl)-3-methyl-4-(3"-amino-6"-sulphophenylazo)-5-pyrazolone. | 2:4:6-trichloro-5-cyano-pyrimidine. | Aniline-4-sulphonic acid | Do. |
| 18 | 1-benzoylamino-7-(3'-amino-6'-sulphophenylazo)-8-naphthol-3:6-disulphonic acid. | ---do--- | Aniline-4-carboxylic acid | Bluish-red. |
| 19 | 2-[2'-methyl-4'(4"-amino-2"-methylphenylazo)-phenylazo]naphthalene-4:8-disulphonic acid. | ---do--- | 5-sulpho-2-aminobenzoic acid. | Brownish-orange. |
| 20 | 1-(5':7'-disulphonaphth-2'-yl)-3-carboxy-4-(3"-amino-6"-sulphophenylazo)-5-pyrazolone. | ---do--- | Aniline-4-sulphonic acid | Greenish-yellow. |
| 21 | 3'-amino-2:4-dinitrodiphenylamine-4'-sulphonic acid | ---do--- | ---do--- | Yellow. |
| 22 | 1-amino-4-(3'-aminoanilino)anthraquinone-2:4'-disulphonic acid. | ---do--- | ---do--- | Reddish-blue. |
| 23 | 1-amino-4-(4'-methylaminoanilino)anthraquinone-2:3'-disulphonic acid. | ---do--- | Aniline-3:5-disulphonic acid. | Do. |
| 24 | 1-amino-4-(4'-aminoanilino)anthraquinone-2:3':5-trisulphonic acid. | 2:4:6-tribromo-5-cyanopyrimidine. | Aniline-3-sulphonic acid | Greenish-blue. |
| 25 | 1-amino-4-[4'-(4"-amino-2"-sulphophenylazo)-anilin]-anthraquinone. | 2:4:6-trichloro-5-cyano-pyrimidine. | ---do--- | Olive green. |
| 26 | Copper complex of 2-amino-6-[4'-(2":5"-disulphophenylazo)-2'-methoxy-5'-methylphenylazo]-5-naphthol-1:7-disulphonic acid. | 2:4:6-trichloro-5-cyano-pyrimidine. | N-(β-hydroxyethyl)amine | Blue. |
| 27 | ---do--- | ---do--- | N:N-di(β-hydroxyethyl)-amine. | Do. |
| 28 | ---do--- | ---do--- | 1-naphthylamine | Do. |
| 29 | Copper complex of 4:4'-bis-(1"-hydroxy-8"-amino-3":6"-disulphonaphth-2"-ylazo)-3:3"-dimethoxydiphenyl. | ---do--- | Dimethylamine | Do. |
| 30 | 1-amino-7-[4'-(2'sulphophenylazo)-2'-methoxy-5'-methylphenylazo]-8-naphthol-3:6-disulphonic acid. | ---do--- | Aniline-3-sulphonic acid | Do. |
| 31 | 1-amino-7-[4'-(4":8"-disulphonaphth-2"-ylazo)-2':5'-dimethoxyphenylazo]-8-naphthol-3:6-disulphonic acid. | ---do--- | 1-naphthylamine-6-sulphonic acid. | Do. |
| 32 | 1-(3'-aminophenyl)-3-carboxy-4-(1":5"-disulphonaphth-2"-ylazo)-5-pyrazolone. | ---do--- | N-methylaniline-3-sulphonic acid. | Greenish-yellow. |
| 33 | 1-(2':5'-dichloro-4-sulphophenyl)-3-methyl-4-(3"-amino-6"-sulphophenylazo)-5-pyrazolone. | ---do--- | ---do--- | Do. |
| 34 | 2-methylamino-7-(2'-sulpho-4'-methoxyphenylazo)-8-naphthol-6-sulphonic acid. | 2:4:6-trichloro-5-cyano-pyrimidine. | Methylamine | Red. |
| 35 | 2-methylamino-6-(2'-sulpho-4'-methoxyphenylazo)-5-naphthol-7-sulphonic acid. | ---do--- | n-Butylamine | Scarlet. |

| Example | Dyestuff Compound | Pyrimidine | Amine | Shade |
|---|---|---|---|---|
| 36 | 2-methylamino-6-(2'-sulpho-4'-methoxyphenylazo)-5-naphth 1-7-sulphonic acid. | 2:4:6-trichloro-5-cyanopyrimidine. | Dimethylamine | Scarlet. |
| 37 | 2-amino-6-(2'-sulpho-4'-methoxyphenylazo)-5-naphthol-7-sulphonic acid. | ___do___ | Aniline-3:5-disulphonic acid. | Do. |
| 38 | 1-(3'-amino-6'-sulphophenylazo)-2-naphthylamine-5:7-disulphonic acid. | ___do___ | 2-naphthylamine-5:7-disulphonic acid. | Reddish-yellow. |
| 39 | Copper complex of 1-amino-7-[4'-(2''-sulphophenylazo)-2'-methoxyphenylazo]-8-naphthol-3:6-disulphonic acid. | ___do___ | Aniline-3-sulphonic acid | Blue. |
| 40 | ___do___ | ___do___ | 5-sulpho-2-aminobenzoic acid. | Do. |
| 41 | Copper complex of 2-amino-6-[4'-(2''-sulphophenylazo)-2'-methoxy-5'-methylphenylazo]-5-naphthol-1:7-disulphonic acid. | ___do___ | Ammonia | Do. |
| 42 | Copper complex of 2-(4'-amino-3'-sulphophenylamino)-7-[4''-(2'''-5'''-disulphophenylazo)-2''-methoxy-5''-methylphenylazo]-8-naphthol-6-sulphonic acid. | ___do___ | Aniline-3-sulphonic acid | Grey. |
| 43 | 1:2-chromium complex of 2-(3'-sulphoanilino)-7-(2''-carboxy-4''-aminophenylazo)-8-naphthol-6-sulphonic acid. | 2:4:6-trichloro-5-cyanopyrimidine. | Ammonia | Brown. |
| 44 | 1:2-chromium complex of 2-amino-6-(2'-carboxyphenylazo)-5-naphthol-7-sulphonic acid. | ___do___ | Aniline-3-sulphonic acid | Reddish-brown. |
| 45 | Copper complex of 1-amino-7-(5'-amino-2'-hydroxy-3'-sulphophenylazo)-8-naphthol-2:4-disulphonic acid. | ___do___ | Aniline | Blue. |
| 46 | Copper complex of 1-amino-7-(2'-hydroxy-5'-sulphophenylazo)-8-naphthol-3:6-disulphonic acid. | ___do___ | Aniline-3-carboxylic acid | Violet. |
| 47 | Copper complex of 1-amino-7-(2'-hydroxy-3'-chloro-5'-sulphophenylazo)-8-naphthol-3:6-disulphonic acid. | ___do___ | N-methylaniline | Purple. |
| 48 | ___do___ | ___do___ | N-ethylaniline | Do. |
| 49 | Copper complex of 2-amino-6-(2'-hydroxy-5'-sulphophenylazo)-5-naphthol-1:7-disulphonic acid. | ___do___ | Aniline-3-sulphonic acid | Rubine. |
| 50 | ___do___ | ___do___ | N-methylaniline-3-sulphonic acid. | Do. |
| 51 | 1:2-chromium complex of 1-amino-7-(2'-hydroxy-5'-nitrophenylazo)-8-naphthol-3:6-disulphonic acid. | ___do___ | Aniline-3-sulphonic acid | Grey. |
| 52 | 1:2-cobalt complex of 1-amino-7-(2'-hydroxy-5'-nitrophenylazo)-8-naphthol-3:6-disulphonic acid. | ___do___ | ___do___ | Reddish-grey. |
| 53 | 1:2-chromium complex of 1-amino-7-(4'-amino-2'-carboxyphenylazo)-8-naphthol-2:4-disulphonic acid. | 2:4:6-trichloro-5-cyanopyrimidine. | 5-amino-2-hydroxybenzoic acid. | Grey. |
| 54 | 1:2-chromium complex of 1-amino-7-(2'-hydroxy-3'-sulpho-5'-nitrophenylazo)-8-naphthol-3:6-disulphonic acid. | ___do___ | Ammonia | Do. |
| 55 | ___do___ | ___do___ | Ethylamine | Do. |
| 56 | Copper complex of 2-amino-7-[4'-(2''-sulpho-4''-methylphenylazo)-2'-methoxy-5'-methylphenylazo]-8-naphthol-3:6-disulphonic acid. | ___do___ | Aniline-3-sulphonic acid | Blue. |
| 57 | 4-(4''-N-methylaminophenylazo)-4'-nitrostilbene-2:2'-disulphonic acid. | ___do___ | Aniline | Reddish-yellow. |
| 58 | 1:2-cobalt complex of 1-amino-7-(2'-hydroxy-3'-sulpho-5'-nitrophenylazo)-8-naphthol-3:6-disulphonic acid. | ___do___ | Ammonia | Reddish-grey. |
| 59 | Copper complex of 2-amino-7-[4'-(4''-methyl-2''-sulphophenylazo)-2'-methoxy-5'-methylphenylazo]-8-naphthol-3:6-disulphonic acid. | ___do___ | Aniline-4-sulphonic acid | Blue. |
| 60 | Copper complex of 2-amino-7-[4'-(3''-chloro-4''-methyl-6''-sulphophenylazo)-2'-methoxy-5'-methylphenylazo]-8-naphthol-3:6-disulphonic acid. | ___do___ | 5-sulpho-2-aminobenzoic acid. | Grey. |
| 61 | Copper complex of 2-amino-6-[2'-hydroxy-3'-amino-5'-sulphophenylazo]-5-naphthol-1:7-disulphonic acid. | 2:4:6-trichloro-5-cyanopyrimidine. | Aniline-4-carboxylic acid | Rubine. |
| 62 | 1:2-cobalt complex of 2-amino-6-(2'-hydroxy-3'-sulpho-5'-nitrophenylazo)-5-naphthol-1:7-disulphonic acid. | ___do___ | Aniline-3-sulphonic acid | Brown. |
| 63 | Copper phthalocyanine-3-sulphon-N-(3'-aminophenyl)amide-3-sulphonamide-3-sulphonic acid. | ___do___ | ___do___ | Turquoise. |
| 64 | ___do___ | ___do___ | Aniline-2:5-disulphonic acid | Do. |
| 65 | ___do___ | ___do___ | Aniline-3:5-disulphonic acid | Do. |
| 66 | Copper phthalocyanine-3-sulphon-N-(4'-N-methylaminophenyl)amide-3-sulphonamide-3-sulphonic acid. | ___do___ | Aniline-3-sulphonic acid | Do. |
| 67 | Copper phthalocyanine-3-sulphon-N-(3'-sulpho-4'-aminophenyl)-amide-3-sulphonamide-3-sulphonic acid. | ___do___ | ___do___ | Do. |

What we claim is:

1. The dyestuffs which are represented by the formula:

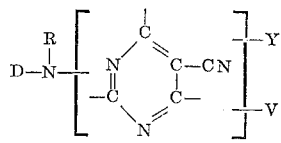

wherein D represents a dyestuff radical selected from the class consisting of dyestuff radicals of the azo, anthraquinone, nitro and phthalocyanine series wherein the group

is attached directly to a carbon atom present in the dyestuff radical D and wherein the carbon atom may form part of an aryl ring present in D, or may form part of an alkyl chain which is directly attached to an aryl ring present in D or is attached through a bridging atom or group selected from the members of the group consisting of —O—, —S—, —CO—, —SO₂—, —NH—,
—N-alkyl, —CONH—, —SO₂NH— and —SO₂N-alkyl R is selected from the class consisting of hydrogen and lower alkyl;

Y is a halogen atom selected from the class consisting of chlorine and bromine atoms;

and V is a radical selected from the class consisting of amino, lower alkylamino, hydroxy lower alkylamino, anilino, N-lower alkyl anilino, naphthylamino, and anilino, N-lower alkylanilino and naphthylamino radicals substituted by at least one group selected from the class consisting of carboxylic acid and sulphonic acid groups.

2. Dyestuffs as claimed in claim 1 wherein the dyestuff radical represented by D contains at least one sulphonic acid group.

References Cited by the Examiner

UNITED STATES PATENTS 3,120,507   3/1964   Andrew et al. _____ 260—146

CHARLES B. PARKER, *Primary Examiner.*

F. D. HIGEL, *Assistant Examiner.*